United States Patent
Dingler et al.

(10) Patent No.: US 8,170,580 B2
(45) Date of Patent: May 1, 2012

(54) GEO-BOUNDARY TRIGGERED MESSAGING AND SCHEDULE SYSTEM AND METHOD OF USE

(75) Inventors: John R. Dingler, Dallas, GA (US); Pramodh D. Narayan, Naperville, IL (US); Sri Ramanathan, Lutz, FL (US); Michael J. Singer, Naperville, IL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 12/264,672

(22) Filed: Nov. 4, 2008

(65) Prior Publication Data

US 2010/0113066 A1    May 6, 2010

(51) Int. Cl.
*H04W 24/00* (2009.01)
(52) U.S. Cl. .................... 455/456.1; 455/456.3
(58) Field of Classification Search ............... 455/456.1, 455/456.2, 456.3
See application file for complete search history.

(56) References Cited

U.S. PATENT DOCUMENTS

| | | | |
|---|---|---|---|
| 6,044,275 A | 3/2000 | Boltz et al. | |
| 6,119,014 A | 9/2000 | Alperovich et al. | |
| 6,647,269 B2 * | 11/2003 | Hendrey et al. | 455/456.3 |
| 7,133,685 B2 * | 11/2006 | Hose et al. | 455/456.1 |
| 7,627,310 B2 * | 12/2009 | Starr et al. | 455/414.2 |
| 7,725,362 B2 * | 5/2010 | Weathers, Jr. | 705/26.8 |
| 7,801,538 B2 * | 9/2010 | Weiser et al. | 455/456.3 |
| 7,840,224 B2 * | 11/2010 | Vengroff et al. | 455/456.1 |
| 7,848,765 B2 * | 12/2010 | Phillips et al. | 455/456.3 |
| 7,894,987 B1 * | 2/2011 | Tester et al. | 701/213 |
| 2004/0176107 A1 | 9/2004 | Chadha | |
| 2004/0266398 A1 | 12/2004 | Adamczyk et al. | |
| 2005/0101335 A1 | 5/2005 | Kelly et al. | |
| 2006/0078122 A1 | 4/2006 | Dacosta | |
| 2006/0089163 A1 | 4/2006 | Khawand et al. | |
| 2007/0270133 A1 | 11/2007 | Hampel et al. | |
| 2009/0286553 A1 * | 11/2009 | Northway et al. | 455/456.3 |

OTHER PUBLICATIONS

Munson et al., "Location-Based Notification as a General Purpose Service", Sep. 28, 2002 (WMC '02).*

* cited by examiner

*Primary Examiner* — Nick Corsaro
*Assistant Examiner* — Michael S Bush
(74) *Attorney, Agent, or Firm* — Anna Linne; Roberts Mlotkowski Safran & Cole, P.C.

(57) ABSTRACT

A location based system is provided is configured to provide messages to a recipient based on time and location based information. The a method includes detecting when a mobile user has crossed within a predefined geo-boundary. The method further includes sending a message to the mobile user when the mobile user has crossed within the predefined geo-boundary during a predetermined time period set by an originator of the message.

22 Claims, 5 Drawing Sheets

GEO-BOUNDARY TRIGGERED MESSAGING AND SCHEDULE SYSTEM AND METHOD OF USE

FIELD OF THE INVENTION

The invention generally relates to a location based system for providing messages to a recipient and, in particular, to a location based system that is configured to provide messages to a recipient based on time and location based information.

BACKGROUND

Faced with an increasingly difficult challenge in growing both average revenue per user (ARPU) and numbers of subscribers, wireless carriers are trying to develop a host of new products, services, and business models based on data services. One such service is location services, which provide information specific to a location including actual locations of a user. It is expected that location based services will generate additional business for the carrier, from both the mobile user and content providers.

For the mobile user as well as the service provider, location-based services offer many opportunities. For example, location-based services can increase revenue of the service provider, e.g., network carrier, while improving services to end users, e.g., mobile users. Some examples of location-based services that can be provided to the mobile user include:

Providing the nearest business or service, such as an ATM or restaurant;
Providing alerts, such as notification of a sale on gas or warning of a traffic jam;
Providing weather reports which are germane to the location where the user is using the mobile device; and/or
Providing messages to end users, e.g., recipients, etc.

For the network carrier, location-based services provide value add by enabling services such as:

Resource tracking with dynamic distribution (e.g., taxis, service people, rental equipment, doctors, fleet scheduling, etc.);
Finding people or information for the user (e.g., person by skill (doctor), business directory, navigation, weather, traffic, room schedules, stolen phone, emergency 911);
Proximity-based notification (push or pull) (e.g., targeted advertising, buddy list, common profile matching (dating), automatic airport check-in); and
Proximity-based actuation (push or pull) (e.g., payment based upon proximity (EZ pass, toll watch).

In addition, location based services (LBS) are convenient for sharing location data and other information between wireless devices to wireless devices and from wireless devices to stationary devices like a home computer or stationary tracking system or content provider, etc. This would allow a third party to determine an exact location of a mobile user such as, for example, a family member, friend, employee, etc.

Two methods are commonly in use to determine the location of a wireless device with a third method starting to become more popular. These methods include signal strength of cell towers that are near the wireless device (e.g., triangulation); GPS triangulation; and exposing the LBS as a web service.

The first method determines a wireless device's location by comparing the signal strength of cell towers that are near the wireless device. This method is called triangulation and is substantially the same method that GPS devices use to determine their location. The difference between cell triangulation and GPS triangulation, though, is the signals they use to determine location. The second method, GPS triangulation, uses satellites to determine a device location. In either case, the latitude and longitude are kept in the location services infrastructure.

Another method includes creating location based services by exposing the LBS as a web service. For example, when a device wants an update from the location-based system, it sends a request with the proper authentication credentials and a unique identifier that describes the device that is being tracked. The LBS returns the coordinates of the device being queried.

One of many issues facing the actual commercial deployment of location based services is privacy of the mobile user. These issues imply that significant work still needs to be done around the whole area of location privacy. For example, the following issues arise with privacy:

Determining location data associated with a target device and allowing external entities to access this information requires that the target device (or owner of that device) actually is aware of such access and has indicated so both implicitly and explicitly;
A general purpose authorization model that is easy to implement and widely accepted has still not been "rolled out" by many wireless service providers; and
Regulatory requirements require that exceptions be built into the infrastructure. For example location fixes for purposes of locating an emergency caller via the 911 infrastructure needs to be able to locate the caller regardless of their actual preferences.

Accordingly, there exists a need in the art to overcome the deficiencies and limitations described hereinabove.

SUMMARY

In a first aspect of the invention, a method comprises detecting when a mobile user has crossed within a predefined geo-boundary. The method further comprises sending a message to the mobile user when the mobile user has crossed within the predefined geo-boundary during a predetermined time period set by an originator of the message.

In another aspect of the invention, a computer program product comprising a computer usable storage medium having readable program code tangibly embodied in the medium is provided. The computer program product is operable to: receive detection of when a mobile user has crossed within a predefined zone; retrieve a message to send to the mobile user; and send the message to the mobile user when the mobile user has been detected to cross within the predefined zone during a user defined time period.

In another aspect of the invention, a method for sending a message to one or more recipients comprises providing a computer infrastructure being operable to: check a scheduler for any messages that need activation during a user defined time period; activate the message during the user defined time period; and send the message to one or more recipients after the message has been activated and the one or more recipients are within a user defined location.

In yet another aspect of the invention, a system comprises a computer infrastructure and computer instructions tangibly embodied on storage medium. The computer instructions comprises at least a first set of instructions that is configured to send a message to one or more user defined recipients at user defined time periods and locations, upon activation of the message and after checking a scheduler for any messages that need activation during the user defined time periods.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
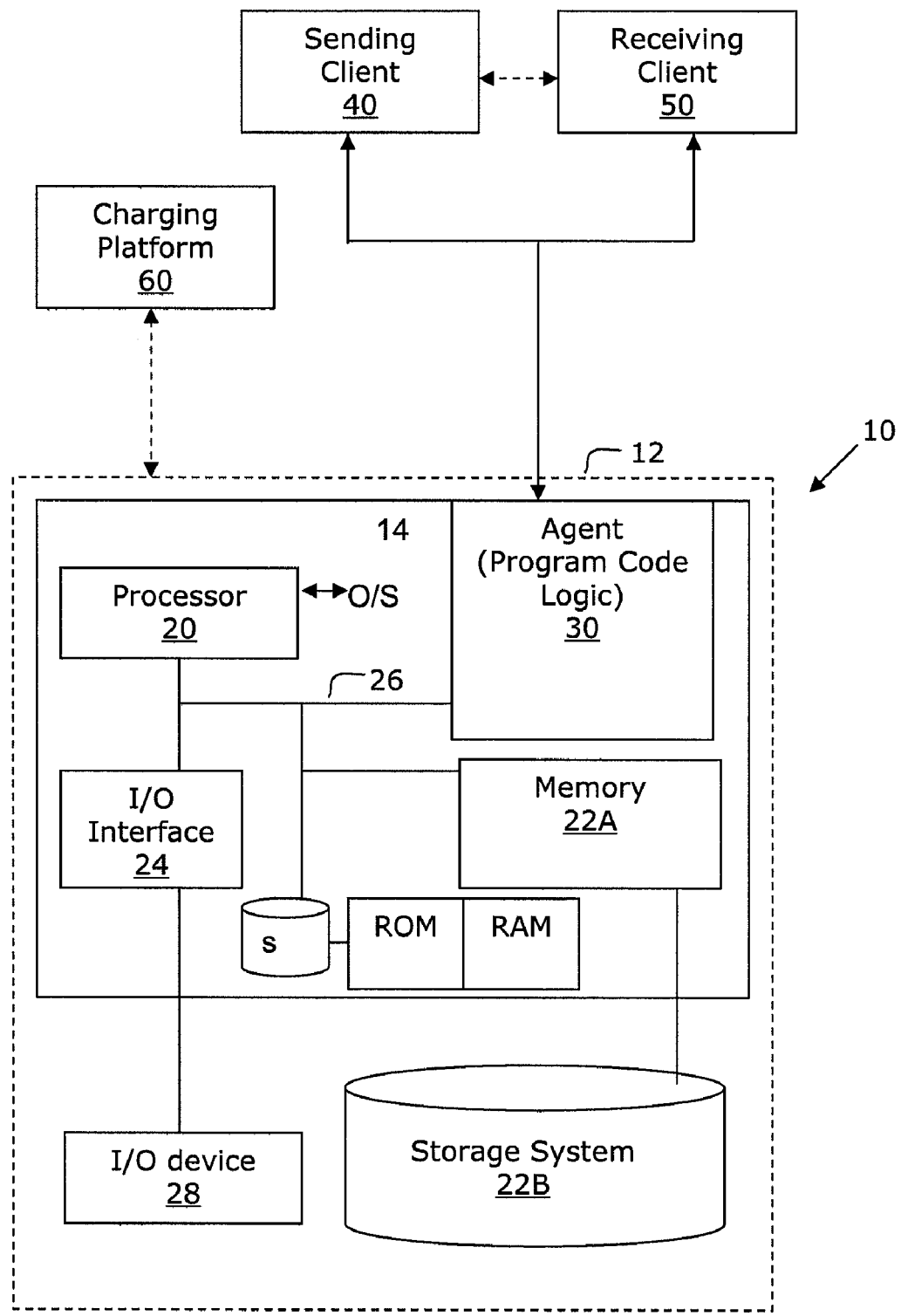
FIG. 1 shows an illustrative environment for implementing processes in accordance with the invention.

The invention generally relates to a location based system for providing messages to a recipient and, in particular, to a location based system that is configured to provide messages to a recipient based on time and location of the recipient. More specifically, the system and method uses geographic boundaries (geo-boundaries) and time information in order to determine when to send a message to one or more recipients. In embodiments, a user such as a service provider, e.g., network carrier, content provider, advertiser, third party service provider, etc. can target messages to a recipient based on a certain time that the recipient is at a certain location. The messages can be, for example, a text message, an advertisement or other content sent to individuals by SMS, Session Initiation Protocol (SIP), Microsoft Media Server (MMS), Simple Mail Transfer Protocol (SMTP), Web Services, Rich Site Summary (RSS) feeds (also referred to as Really Simple Syndication (RSS 2.0)", "RDF Site Summary (RSS 1.0 and RSS 0.90)", or "Rich Site Summary (RSS 0.91)) or ATOM feeds. These messages can be sent to the recipient at a predetermined time based on the recipient's location.

Advantageously, by implementing the present invention it is possible to leverage geo-boundary identification to provide multi-channel delivery of predefined digital media content or other messages on a peer to peer basis when target endpoints (e.g., defined recipients) cross-specified geo-boundaries. In embodiments, the system and method sets up a geo-boundary that can be, for example, based on a location of a sender's wireless device. The location can be obtained from GPS, A-GPS, or triangulation methodologies, all of which are known to those of skill in the art such that further explanation is not required herein. The location information can also be entered by using a mapping program of a content provider, e.g., by pointing and clicking on a specific location on a map. The location information can include a radius of the geo-boundary.

In embodiments, the system and method can limit the scope of a geo-boundary to radius about a certain location. Also, the system and method can be configured to send a message during a certain time period, e.g., a starting and stopping time based on the input of the user. Under the present invention, the sender of the message has control over the starting time, ending time and location for the delivery of the geo-boundary message and can receive a confirmation message. In embodiments, the system and method provides a method for correlating audio, video, and text message to a target location. The system and method can also provide a confirmation that a message has been delivered to the recipient, and the location-based trigger can be disabled upon confirmation of the delivery. A triggering mechanism also provides receipt confirmation to allow for accurate billing and accounting of the location based message. Advantageously, the invention also allows multiple recipients to be the target of a time-based geo-boundary message such that the message, e.g., audio, video, text messages, etc., can be correlated to different recipients at multiple target locations.

It should be understood by those of skill in the art that although the location information can be obtained using known methodologies, the present invention expands such methodologies by detecting the location information of particular recipients at particular times. For example, a local agent residing on a recipient's handheld device can use locally cached location information obtained by GPS, A-GPS or mechanisms other than the telecommunications network in order to provide location information to a service provider.

The signal provided by the recipient's mobile device to the service provider, e.g., network carrier, may be, for example a wireless application protocol (WAP). Those of skill should recognize that WAP is an international standard for applications that uses wireless communications. WAP's principal application is to enable access to the Internet from a mobile phone or PDA (e.g., handheld device). A WAP browser provides all of the basic services of a computer based web browser but simplified to operate within the restrictions of the handheld device. Those of skill in the art should also appreciate that the present invention is not limited to WAP applications, but may be implemented using any wireless data protocol such as, for example, the Japanese i-mode system.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
    a hard disk,
    a random access memory (RAM),
    a read-only memory (ROM),
    an erasable programmable read-only memory (EPROM or Flash memory),
    a portable compact disc read-only memory (CDROM), and/or
    an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server 12 that can perform the processes described herein. In particular, the server 12 includes a computing device 14. The computing device 14 can be resident on a carrier network infrastructure, a message server, content provider server, or other third party service provider (any of which is generally represented in FIG. 1).

The computing device 14 includes an Agent 30 (module or program control) configured to make computing device 14 operable to perform the services described herein. The implementation of the Agent 30 provides an efficient way in which a sending client 40 (e.g., a user of a mobile device, a content provider, an advertiser, etc.) can send messages to a recipient 50 at predefined locations and time periods, e.g., a starting time and an ending time. The Agent 30 can be one or more computing modules, representing each of the modules or "players" discussed with reference to FIGS. 2-4, and can be implemented by a service provider such as, for example, a network carrier and/or message server as discussed in greater detail below. By using this system and methodology, the network carrier will not have to make any significant infrastructure investments, as the preexisting infrastructure is utilized with the present invention.

By way of illustration, the Agent 30 will receive location based information from a sender 40 and a recipient 50. For example, the sender 40 will enter a specific location in which the recipient 50, once at such location, can receive a message. The location may be the current location of the sender 40 or a location set by the sender 40 by entering latitude and longitudinal coordinates, a landmark or other known location. In further embodiments, the sender 40 can enter a specific location using mapping programs provided by third party providers. The sender 40 can also enter a geo-boundary such as, for example, a predetermined radius from the identified location. The sender 40 will also enter a time in which the message is to be sent to one or more recipients 50. Similarly, a recipient's device can transmits its location to the Agent 30 using, for example, GPS, A-GPS or triangulation methodologies.

In further embodiments, the sender 40 will also enter contact information of the recipient 50 such as, for example, an email address or user ID, as well as a message that is to be sent to the recipient 50. The sender 40 can also enter addresses for multiple recipients 50 and multiple times. The sender 40 can store message in the storage system 22B or on the user's own device. The message can be, for example, a text message, video, audio or other content. In embodiments, the user can also enter a URL of the content so that the content can be pushed to the recipient 50, once the recipient 50 is detected to be within the geo-boundary and a certain time. Depending on the message type, the message can be sent by SMS, SIP, SMTP, Web Services, RSS feed or ATOM based feed.

The location information can be used by advertisers or other service or content providers to target individuals based on their location. For example, based on a subscription or fee, an advertiser can subscribe or otherwise obtain the location of the recipient based on the published information and, using this information, target advertisements to the recipient based on his or her location and time of day, etc. In embodiments, the subscribing parties such as, for example, the advertiser, can be charged a fee for obtaining a notification of the user's location, as well as for pushing an advertisement (or other message) to the recipient 50.

In yet another embodiment, the system and method provides a triggering mechanism for multiple tier receipt confirmations to allow for accurate billing and accounting of geo-boundary based messaging. For example, a charging platform 60 is maintained to provide charging models to charge for services rendered. The charging platform 60 may be maintained, deployed, created and/or serviced by the service provider. The charging platform 60 is designed to generate a charging record for services rendered to a subscriber, e.g., the sending client (originator) will be charged for the services rendered (sending or receiving of content) based on the charging model implemented by the system and method of the invention. In embodiments, the service provider and/or Agent 30 can calculate an amount to be charged, based on many different considerations and generate the charging record to be sent to the charging platform 60. In turn, the charging platform 60 can generate an invoice and/or deduct a usage charge from an account of the subscriber.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the handheld device.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator or LBS, could offer to perform the processes described herein. In this case, the service provider can create, maintain, deploy, support, etc., the computer infrastructure that performs the process steps of the invention for one or more customers. The customers may be, for example, a mobile user or a third party requesting information about the location and/or route of the mobile user. In return, the service provider can receive payment from the customer(s) under a subscription and/or fee agreement and/or the service provider can receive payment from the sale of advertising content to one or more third parties.

Exemplary Processes

Figure 2:
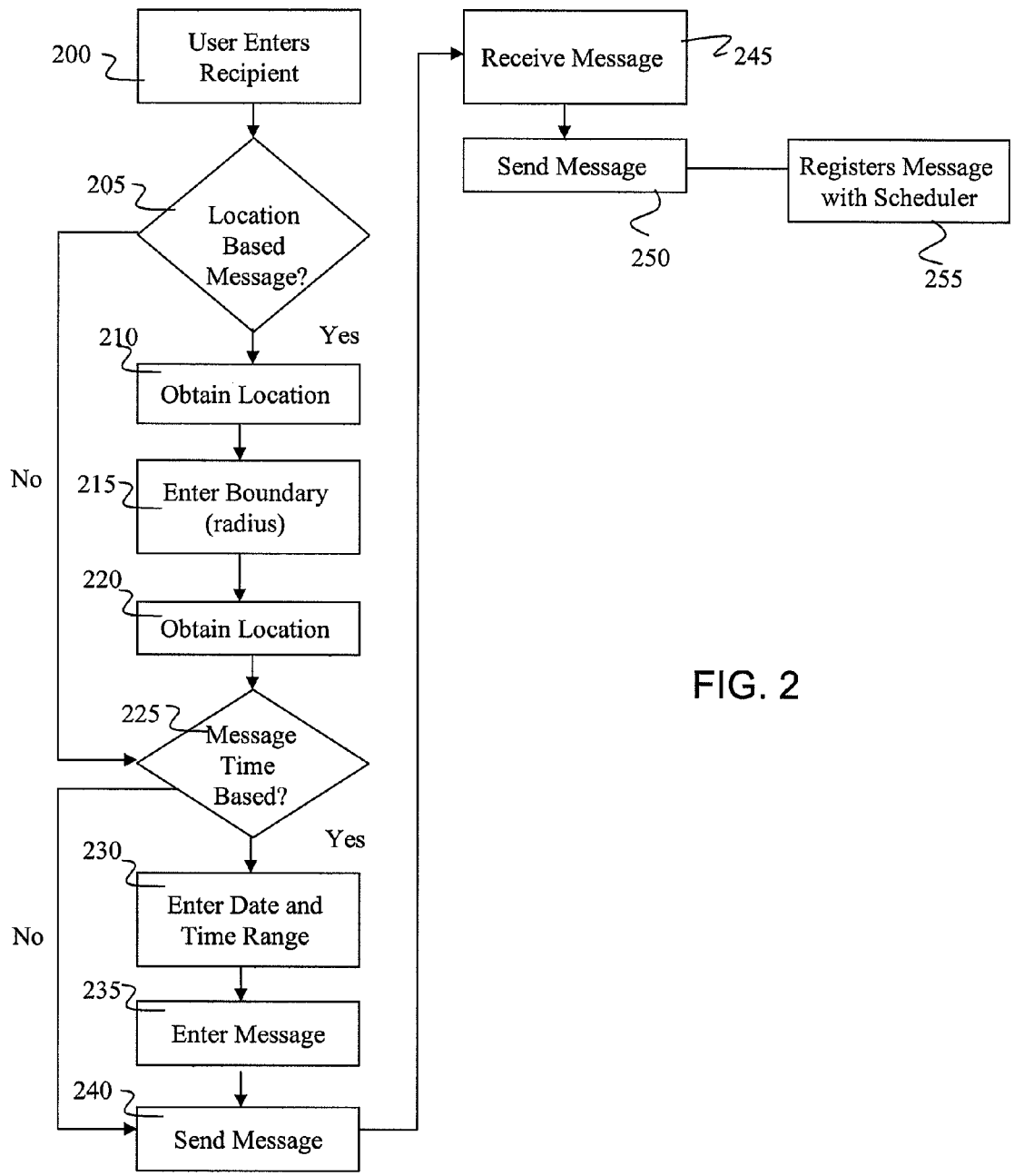
FIG. 2 is a flow diagram showing a message registration process in accordance with aspects of the present invention.
Figure 3:
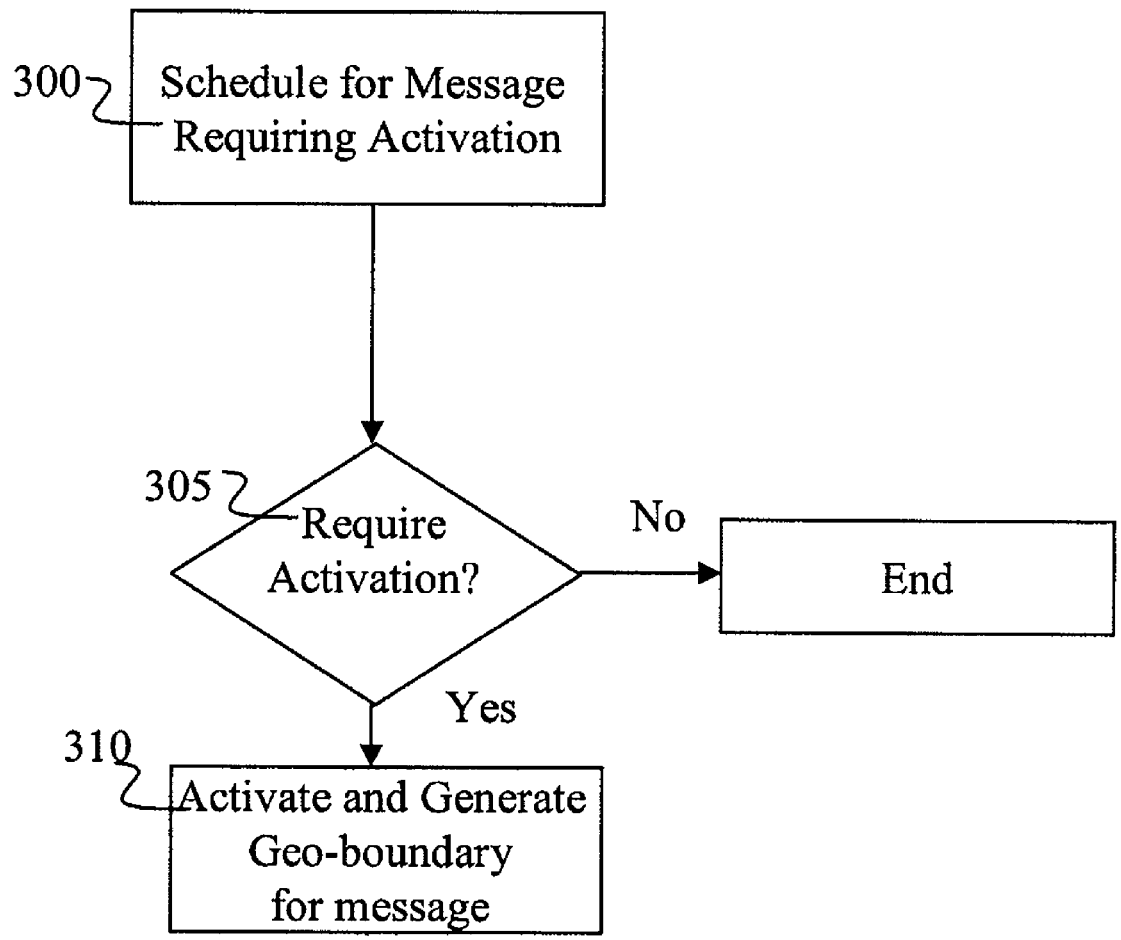
FIG. 3 is a flow diagram showing a boundary message process in accordance with aspects of the present invention.
Figure 4:
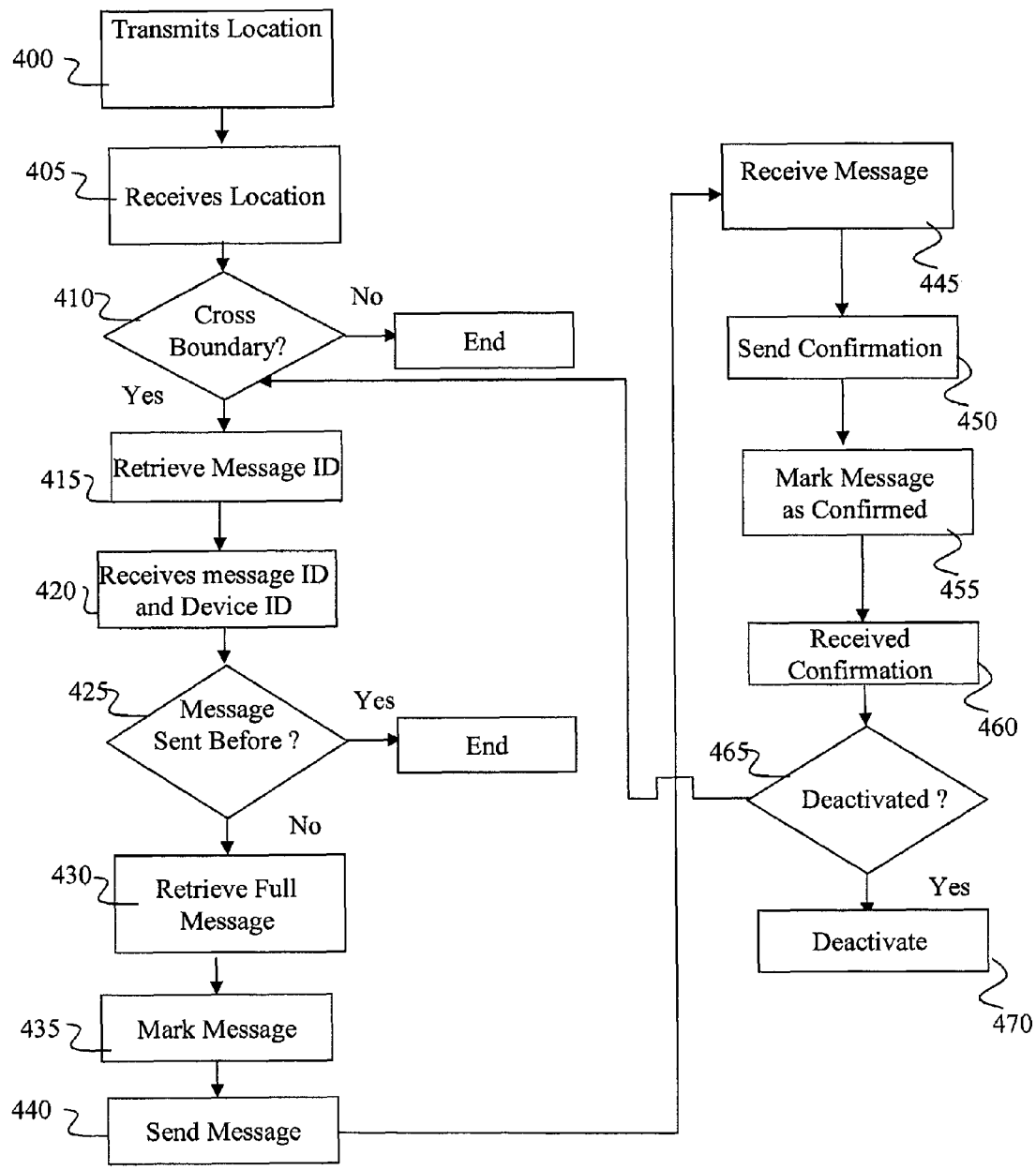
FIG. 4 is a flow diagram showing a message retrieval process in accordance with aspects of the present invention.

FIGS. 2-4 illustrate exemplary processes in accordance with the present invention. The steps of FIGS. 2-4 may be implemented on the computer infrastructure of FIG. 1, for example. The flow diagrams in FIGS. 2-4 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams, and combinations of the flow diagrams illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, the invention is separated into different call flows. For example, the flow of FIG. 2 is concerned with messages being provisioned into the location based service and message server. In the flow of FIG. 2, the sender enters in a message and may indicate in the message a location through the use of longitude and latitude coordinates, GPS, pushpins, or triangulation. After determining the center of the location the sender may determine a radius in which to send to a message server. In addition to the location and radius, the sender can also set a date and time range for the location based service trigger and the recipients that may receive the message. Each message itself can be composed of audio, video and/or text. The message server receives the message, and stores the message along with the unique ID in a repository, e.g., storage system 22B. It also registers the trigger location and time into the location based service for scheduling. The message server also sends each recipient to a location-based service that can receive the message, which allows each message to be delivered to multiple recipients. That is, in embodiments, the same geo-message can be sent to multiple recipients in the manner described herein. Once each recipient receives the message or the timeframe for the messages expires, the geo-message may be removed from the scheduling system.

More specifically, FIG. 2 is a flow diagram showing a message registration process in accordance with aspects of the invention. At step 200, the sender (e.g., wireless device) enters one or more recipients that should receive a message. The sender can also enter the message at this time. As discussed, the sender can send a text message or other type of content such as, for example, audio, video, graphics (e.g., an electronic birthday card), etc. In the case of other content, the sender can retrieve such content from a content provider or it can reside directly on the sender's device.

At step 205, the sender determines whether the message is to be location based. That is, the sender will determine whether the message will be sent to one or more recipients based on the recipients' location. If so, at step 210, the sender will enter a specific location, e.g., a recipient location in order to receive the message. The location may be the current location of the sender, which can be determined by GPS, A-GPS, or triangulation methodologies known to those of skill in the art. In further embodiments, the sender may set the location by entering latitude and longitudinal coordinates, a landmark or other known location. In further embodiments, the sender can enter a specific location using mapping programs provided by third party providers. In this latter example, the mapping coordinates can be downloaded to the sender's device or provided directly to a location based service or message server based on a point and click process. At step 215, the sender can also enter a geo-boundary such as, for example, a predetermined radius from the identified location. This will allow the recipient to receive a location-based message so long as the recipient is within a predetermined distance from the designated location.

At step 225, the sender will determine if the message is to be time based. Step 225 can follow either step 205 or step 220. If the message is time based, the sender will enter a date and/or time range at step 230. If the message is not time based or after entering the time based information at step 230, the sender will input a location/time based sensitive message at step 235. At step 240, the sender will send the message, recipient information (e.g., email address, telephone number, URL, etc.), time based information (if applicable) and location information to a message server. In the case that the content is to be sent directly from a content provider, the sender can simply enter a URL of the content or request that the content be pushed directly to the recipient. In embodiments, the message server can be an SMS server or carrier infrastructure (location-based server) depending on the particular type of message. More specifically, the message service can be any type of service provider such as, for example, a network carrier, solution integrator, a web service, a content provider, etc.

In the case of an SMS text message, at step 245, the message server will receive the message, as well as the time based information (if applicable) and location information. At step 250, the message server will send a message ID to a location-based server. The message ID can include, for example, a recipient's email address, time-based information and location information. In further embodiments, the message ID can include a URL for future retrieval of content. In the case that the message server is a service provider, e.g., carrier, steps 245 and 250 can be eliminated. For example, steps 245 and 250 can be eliminated when the message is a SIP, SMTP, Web Services, RSS Feed or ATOM feed based message (e.g., a non-SMS type message) as such message can go directly to a carrier or other server provider. At step 255, the location-based server (e.g., carrier) will register the message and related information (e.g., time based information and location information) in its scheduler. In further embodiments, the message (text message or other types of content) can be stored on the database of the message server or the location based service. In the case that the information is to be stored at the location based service, such content can be sent directly to the location based service, bypassing the message server. In further embodiments, the message server and the location-based service can be the same entity, e.g., a service provider.

During additional processes, the location based service scheduler checks to see if new events need to have geo-boundaries set, and old events that have exceeded their time limit and expired are removed. For example, in one process flow (FIG. 3), the system and method provides activation and scheduling of new geo-boundaries. When a device communicates its location to the location-based service, the service checks if there is a boundary associated with the device and a message that is active. If there is an active message for that device, the device ID and message ID are sent to the message server, in one example. The message server retrieves the message and sends the message to the wireless device. When the wireless device receives the message it sends a return receipt back to the message server. The message server then sends a confirmation receipt to the location-based service that can remove the boundary for that device during that timeframe. The confirmation receipt on each level provides a mechanism of charging each recipient in the location-based method. Again, the message server can be any service provider such as a carrier infrastructure.

More specifically, FIG. 3 is a flow diagram showing a boundary message process in accordance with aspects of the invention. At step 300, the location based service checks its database (e.g., storage system 22B) for any messages to be activated. That is, the message will be activated according to a user defined time period. At step 305, a determination is made as to whether any message needs to be activated. If not, the process ends. If so, at step 310, the location based service will generate a geo-boundary for the message. That is, the location-based service will set the requested recipient location and its boundaries.

FIG. 4 is a flow diagram showing a message retrieval process in accordance with aspects of the invention. More specifically, at step 400, a recipient's device transmits its location to the location-based service. This recipient can determine its location by, for example, GPS, A-GPS or triangulation methodologies. At step 405, the location-based service receives the location information from the recipient's device. The location of the recipient's device may be transmitted to the location-based service at predetermined intervals such as, for example, every 10 minutes or closer intervals depending on the originally transmitted location. For example, location of the recipient's device can be transmitted to the location-based service every minute if the recipient's device is within a certain distance from the geo-boundary.

At step 410, a determination is made by the location based service as to whether the recipient's device has crossed the geo-boundary. The process ends if the recipient's device is not within the geo-boundary. However, the process can continue in a loop until a recipient is detected to be within the boundary. If the recipient's device is within the geo-boundary, at step 415, the location-based service will retrieve a message ID. The message ID can be stored in the storage system 22B of any of the "players" in the message queue such as the carrier infrastructure, the location based service, the message server, etc. As note above and emphasized herein, the carrier infrastructure, location based service, message server, etc. can be a single entity such as a service provider. The message ID can include, for example, a URL of the content or request that the content be pushed directly to the recipient, the address of the recipient and the time information to send the content to the recipient. In embodiments, at step 420, the message server can receive the message ID and the device ID, for example.

At step 425, the message server (which may be the carrier infrastructure or location based service) will make a determination as to whether the message was already sent to the recipient. If the message was already sent, the process will end. If the message was not already sent, at step 430, the message server will retrieve the message. The message may be residing on any machine/system in the message queue. For example, the message may reside on the message server, the location based service, the carrier infrastructure, a content provider or even the sender of the message. In any scenario, once the message is received, the message is marked as sent to the recipient at step 435. At step 440, the message is sent to the recipient. At step 445, the recipient receives the message and, at step 450, the recipient will send confirmation of receipt. The confirmation can be sent to the message server and/or the location based service at steps 455 and 460, respectively.

At step 465, the location based service makes a determination as to whether the boundary should be deactivated after delivery. This determination may be based on many different considerations such as, for example, whether the user has requested that the message be sent multiple times and/or whether the message is to be sent to multiple recipients. If the boundary is to be deactivated, at step 470, the boundary is deactivated. If not, the process continues to step 410.

Exemplary Architecture

Figure 5:
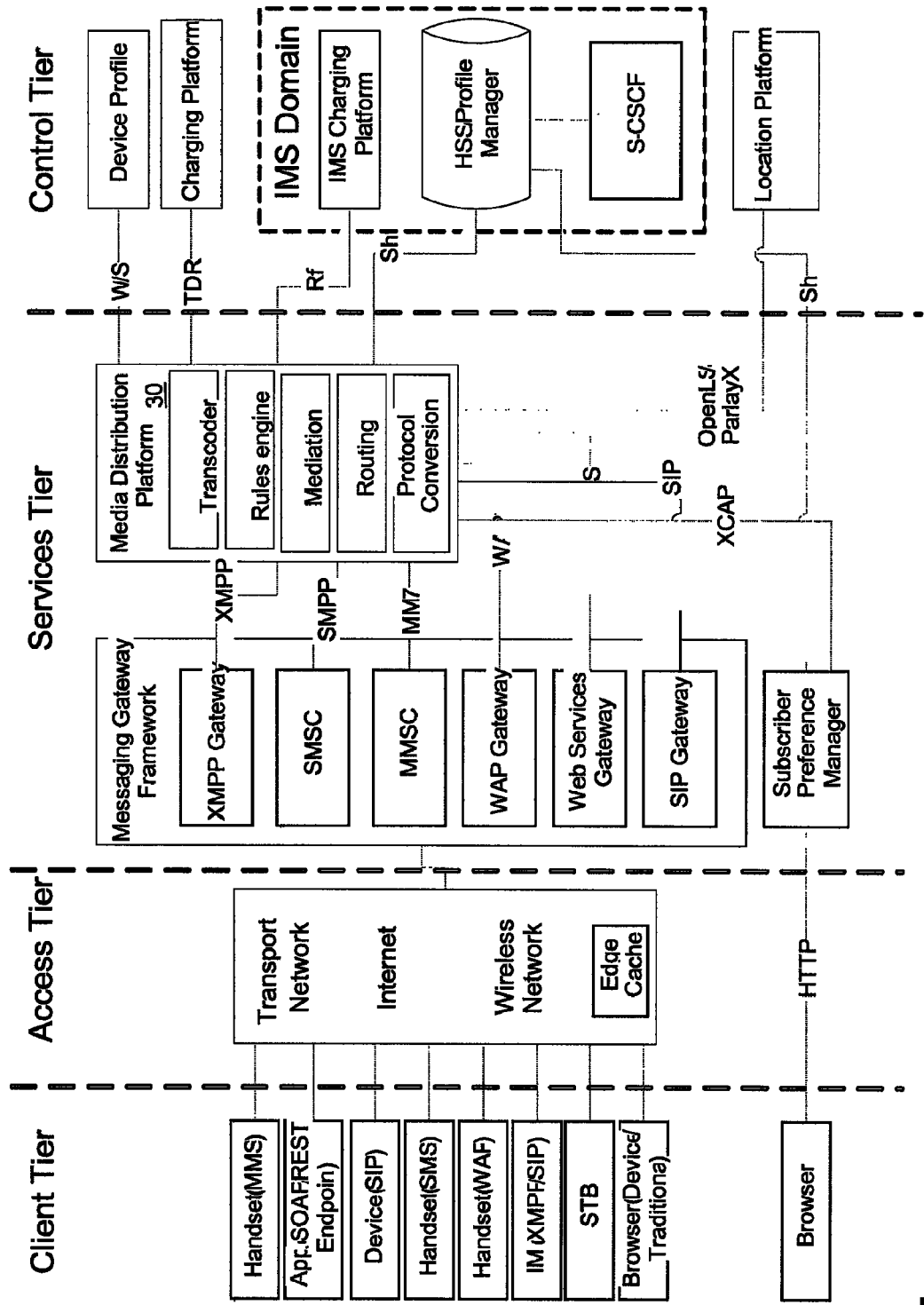
FIG. 5 shows an architecture implementing aspects of the present invention.

FIG. 5 shows an exemplary architecture of the system of the invention. In one contemplated embodiment, the architecture includes four tiers: a Client Tier, an Access Tier, a Services Tier and a Control Tier. The Client Tier represents different types of exemplary delivery and user agent endpoints (receiving client and sending clients) that can be supported with the invention. For example, the Client Tier includes MMS, SMS and WAP handsets, as well as STB, traditional browser type devices, SOAP and REST compliant devices, SIP devices and IM (XMPP/SIP) devices. Each of these devices/handsets is compatible with the system such that they can receive notifications and/or content in accordance with the invention. The Client Tier can also include a browser for initial set-up (refer to FIG. 2).

The Access Tier primarily depicts the transport network which may include the Internet, Wireless Network or edge Cache, amongst other channels of delivery. These channels of delivery will deliver the content and any required notifications via the respective protocols. As discussed above, the content and notifications can be delivered on different channels, depending on the preferences and type of content.

The Services Tier primary contains the Messaging Gateway Framework 65 and the Agent 30 with all the protocol support required to connect to the underlying telecommunications infrastructure platform as well as to the Messaging Gateway Framework via the various protocols that are required for delivery of the content. For example, the Messaging Gateway Framework supports: XMPP (Extensible Messaging and Presence Protocol) Gateway, SMSC (SMPP), MMSC (MM7), WAP Gateway, Web Services Gateway (W/S), and/or SIP Gateway. All of these protocols can be supported by the system and method of the invention, unlike in known technologies.

The Agent is shown as a Media Distribution Platform. The Platform includes a transcoder, as well as a rules engine, mediation, routing and protocol conversion engine. In embodiments, as the sender of content may have no visibility into the receiver's rendering capabilities, the rules engine will be used to parse the preferences of the sender and the receiver in order to coordinate the delivery of the content by the Agent. The mediation can be an Enterprise Service Bus, which is configured to apply the rules (preferences). The protocol conversion engine is a core function, which converts the content from one protocol to another protocol, again depending on the content and preferences. For example, the protocol conversion engine can convert data transmission from asynchronous to synchronous, TCP/IP to another protocol, etc.

The Control Tier primarily comprises elements of the IMS control (e.g., S-CSCF, a charging platform and an HSS). The Control Tier also includes elements of the non-IMS tier networks. For example, a device profile component may be included in the Control Tier, which is a database (e.g., Storage System 22B) storing the preferences of the end points (sending client and receiving client). The Agent can communicate with the device profile via W/S. The Client Tier also includes the location platform, which is in communication with the Agent via Open LS or Parlay X. The Control Tier also includes the charging platform.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method comprising:
    activating, by a processor, a predefined geo-boundary;
    detecting when a mobile user has crossed within the predefined geo-boundary;
    sending a message to the mobile user when the mobile user has crossed within the predefined geo-boundary during a predetermined time period set by an originator of the message;
    deactivating the predefined geo-boundary after predetermined time period has elapsed or the mobile user has received the message;
    marking the message as sent;
    receiving confirmation from the mobile user that the message has been received; and
    deactivating the predefined geo-boundary upon the receiving of the confirmation,
    wherein:
        the predetermined time period comprises a date and time range; and
        the predefined geo-boundary is activated during the predetermined time period.

2. The method of claim 1, wherein the predefined geo-boundary is a predetermined radius from a location of the originator at a certain time.

3. The method of claim 1, wherein the predefined geo-boundary is user defined by at least one of a GPS coordinate, A-GPS coordinate, triangulation methodologies and a mapping program.

4. The method of claim 1, wherein the predefined geo-boundary includes a predefined radius.

5. The method of claim 1, wherein the message is at least one of a text message, an audio message and a video message.

6. The method of claim 1, wherein the predetermined time period is periodically checked to determine if the predetermined time period has expired or the predefined geo-boundary should be activated.

7. The method of claim 1, wherein the message is sent to the mobile user by one of SMS, Microsoft Media Server (MMS), Session Initiation Protocol (SIP), Simple Mail Transfer Protocol (SMTP), Web Service, Rich Site Summary (RSS) Feed or ATOM based feed.

8. The method of claim 1, wherein the steps are provided on a computing infrastructure which is at least one of maintained, deployed, created and supported by a service provider.

9. The method of claim 1, wherein the steps are provided on a software component, a hardware component or a combination of the software component and the hardware component.

10. The method of claim 1, further comprising sending a message ID to a location-based server, the message ID including at least one of a recipient's ID, time-based information and location information.

11. The method of claim 1, further comprising checking to determine if a new event needs to have geo-boundaries set, and old events that have exceeded a time limit and expired are removed.

12. A computer program product comprising a computer usable storage medium having readable program code tangibly embodied in the storage medium, the computer program product being operable to:
   activate a predefined zone;
   receive detection of when a mobile user has crossed within the predefined zone;
   retrieve a message to send to the mobile user;
   send the message to the mobile user when the mobile user has been detected to cross within the predefined zone during a user defined time period; and
   deactivate the predefined zone after the user defined time period has elapsed or upon confirmation that the message was received;
   mark the message as sent;
   receive confirmation that the message was received; and
   deactivate the predefined zone upon the receiving of the confirmation, wherein the user defined time period comprises a date and time range.

13. The computer program product of claim 12, wherein the computer program product is further operable to register the user defined time period and the message in a scheduler and periodically check the scheduler for activation of the predefined zone.

14. The computer program product of claim 12, wherein the message is sent via SMS, SIP, SMTP, Web Services, RSS feed or ATOM based feed.

15. The computer program product of claim 12, wherein the computer program product is provided on a computing infrastructure which is at least one of maintained, deployed, created and supported by a service provider on a fee and/or subscription basis.

16. The computer program product of claim 12, wherein:
   the predefined zone is activated during the user defined time period.

17. A method for sending a message to one or more recipients, comprising:
   providing a computer infrastructure being operable to:
      check a scheduler for any messages that need a user defined geo boundary activated during a user defined time period;
      activate the user defined geo boundary during the user defined time period;
      send the message to one or more recipients after the user defined geo boundary has been activated and the one or more recipients are within the user defined geo boundary;
      deactivate the user defined geo boundary after the user defined time period has elapsed or the one or more recipients have received the message; mark the message as sent; and
      receive confirmation that the message was received.

18. The method of claim 17, wherein the computer infrastructure is at least one of supported, deployed, maintained, and created by a service provider.

19. The method of claim 17, wherein the computer infrastructure is further operable to register the user defined time period and the message in the scheduler and periodically check the scheduler for the activation of the user defined geo boundary.

20. The method of claim 17, wherein the steps are provided on a software component, a hardware component or a combination of the software component and the hardware component.

21. The method of claim 17, wherein:
   the user defined time period comprises a date and time range; and
   the computer infrastructure is further operable to deactivate the user defined geo-boundary upon the receiving of the confirmation.

22. A system comprising:
   a computer infrastructure and computer instructions tangibly embodied on a storage medium, the computer instructions comprising:
      at least a first set of instructions that is configured to send a message to one or more user defined recipients at user defined time periods and within user defined geo-boundaries, upon activation of the user defined geo-boundaries after checking a scheduler for any messages that need the user defined geo-boundaries activated during the user defined time periods;
      at least a second set of instructions that is configured to deactivate the user defined geo-boundaries after the user defined time periods have elapsed or the one or more user defined recipients have received the message; and
      a third set of instructions that is configured to:
         mark the message as sent;
         receive confirmation from the one or more user defined recipients that the message has been received; and
         deactivate the user defined geo-boundaries upon the receiving of the confirmation,
   wherein the user defined time periods comprise date and time ranges.

* * * * *